June 12, 1951  H. F. HOBBS  2,556,809
LIQUID COOLED CLUTCH
Filed Nov. 28, 1947  2 Sheets-Sheet 1

Howard F. Hobbs
Inventor

By Oberlin + Limbach
Attorneys

June 12, 1951  H. F. HOBBS  2,556,809
LIQUID COOLED CLUTCH
Filed Nov. 28, 1947  2 Sheets-Sheet 2
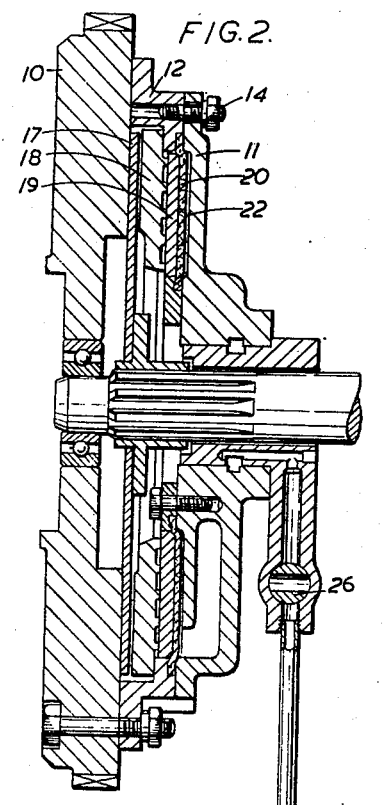
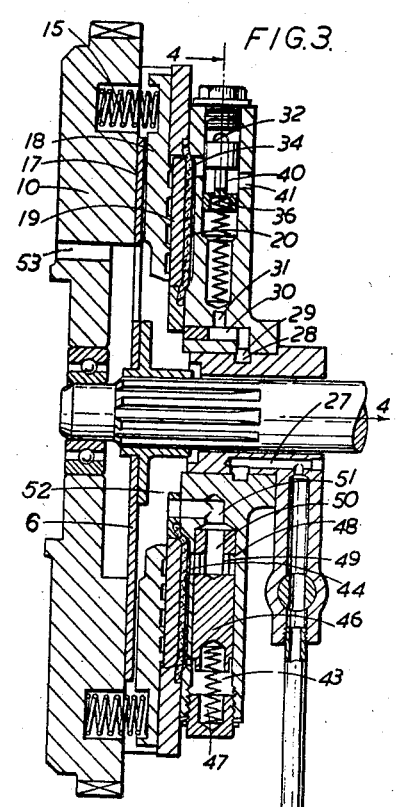
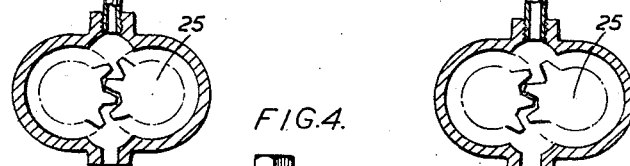
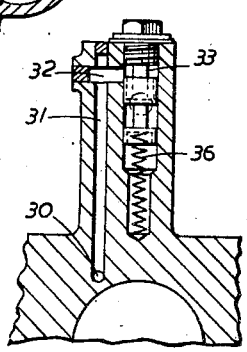
Howard F. Hobbs
Inventor
By Oberlin + Limbach
Attorneys Patented June 12, 1951

2,556,809

UNITED STATES PATENT OFFICE 2,556,809

LIQUID COOLED CLUTCH

Howard Frederick Hobbs, Leamington Spa, England, assignor to Hobbs Transmission Limited, Leamington Spa, England, a British Company Application November 28, 1947, Serial No. 788,615
In Great Britain November 29, 1946

5 Claims. (Cl. 192—88)

This invention relates to friction clutches, and brakes of the kind having cooperating relatively rotary friction plates connected to input and output members, hydraulic means including a pump and at least one flexible diaphragm the latter being concentric with the clutch axis for pressing said surfaces into contact, a heat insulator disc or plate located adjacent to the diaphragm, and a metal pressure plate disposed between the insulator disc and one of the friction plates whereby pressure is transmitted from the diaphragm by the said disc and pressure plate to press the friction plates together.

In construction having grooving in the friction surfaces, by increasing loads and rapidity of engagements and disengagements with a view to testing to destruction, the pressure plate tended to become hotter than the remainder of the clutch with consequential greater wear on the friction lining on the pressure plate side of the friction disc than on its other lining, and with some heating of the diaphragm. One serious disadvantage of the pressure plate becoming hotter than the other friction plate is that the lubricating oil can be removed more readily from the hotter surface and therefore greater work is thrown on the pressure plate, consequently making it hotter still.

The object of the present invention is to provide an improvement which whilst specially adapted for overcoming this overheating in clutches made in accordance with the said prior construction can also be employed with advantage in other friction clutches.

According to the present invention one or more grooves are provided in one or both of a pressure plate and a heat insulator plate, which grooves are located between these plates and at least one oil inlet to the grooves near the inner edge of the plates and at least one outlet near the outer edge of the plates, and are of a sinuous shape between the inner and outer edges, means being provided to supply oil to the inlet, whereby oil will be circulated over a considerable area between the plates before escaping at the outlet.

The grooves may be cut in the metal pressure plate and are closed, except for the inlet and outlet, by the adjacent insulator plate. The groove or grooves can be of various forms and one spiral groove may be cut which leads from the inner to the outer diameter of the pressure plate. Alternatively a number of grooves may be arranged concentrically and the innermost groove may be wholly open to act as a pocket which collects oil and is connected by small openings to the next groove, and so on to the outlets, these openings being arranged at different positions around the grooves. These openings may be formed by cutting away the ribs forming the grooves along a single diameter.

The oil may be circulated in the grooves solely by centrifugal action if the plates rotate, or the oil may be circulated partly or wholly by connection to a pump.

In addition to the advantage provided by the oil circulation, the further advantage is provided that the insulator plate only contacts the ribs of the pressure plate which is a limited area and consequently restricts transference of heat to the insulator plate.

Another advantage of circulating oil over the insulator plate is that a certain amount finds its way to the surface of the diaphragm, and it is found that the synthetic rubber diaphragm maintains its condition much better if amply lubricated on both sides.

The invention will now be described by way of example with reference to the accompanying drawings wherein:

Figure 2 is a sectional view taken at right angles to Figure 1 and including the pump connection;

Figure 3 is a sectional view on the line 3—3 on Figure 1;

Figure 4 is a sectional view on the line 4—4 on Figure 3; and

Figure 1:
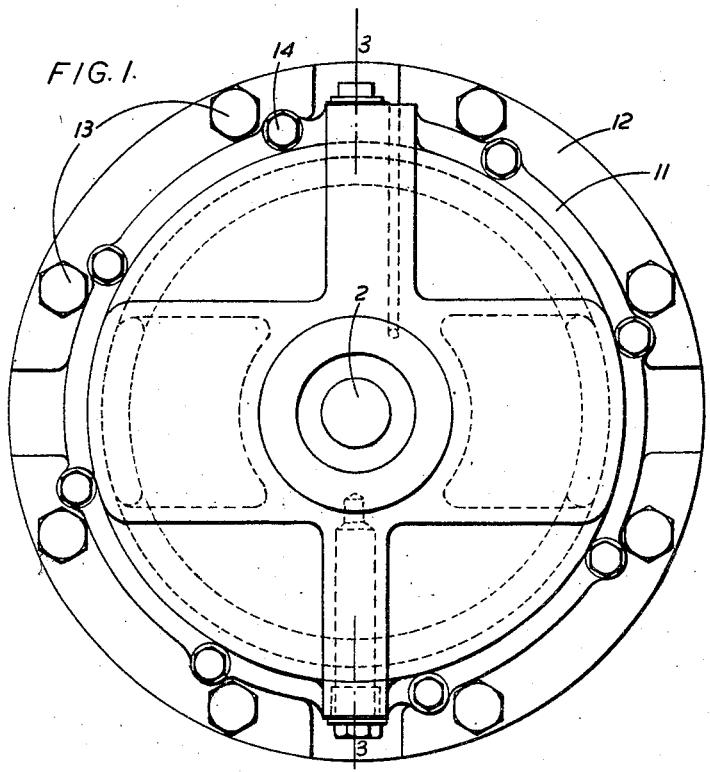
Figure 1 is a rear elevational view of a clutch made in accordance with the invention omitting a central shaft and boss.
Figure 5:
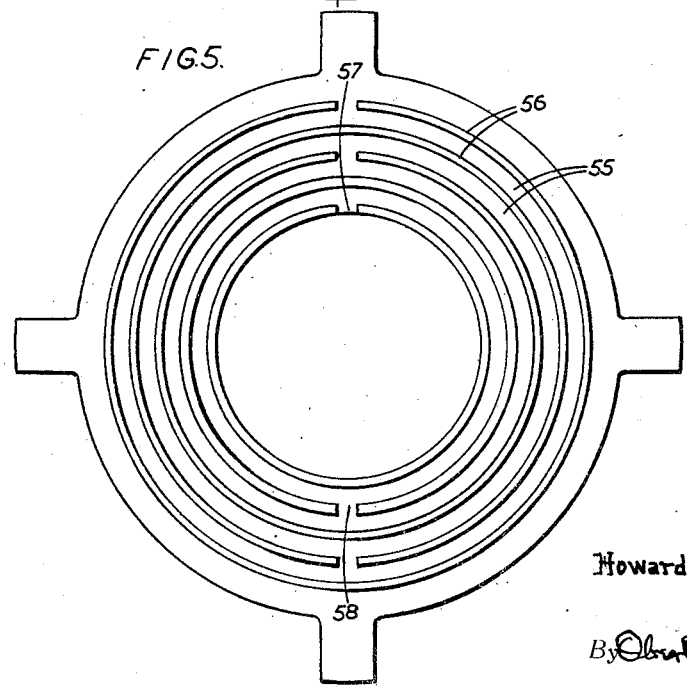
Figure 5 is a rear elevational view of the metal pressure plate shown in Figures 2 and 3.

An engine flywheel 10 carries a rear plate 11 spaced therefrom by a spaced ring 12.

The ring is bolted to the flywheel by bolts 13 and the rear plate is bolted to the ring by bolts 14. The parts 10, 11, 12 form a housing containing a clutch plate 17, which is splined on to a gearbox shaft 5, a metal pressure ring or plate 18, a heat insulator disc or plate 19, and a flexible diaphragm ring 20. The latter is clamped at its outer and inner margins to form a diaphragm pressure chamber 22. This chamber can be supplied with oil under pressure from a pump 25 through a control cock 26, duct 27, annular grooves 28, 29, ducts 30, 31, 32, valve chamber 33, and port 34, located near the outer periphery of the diaphragm chamber. The valve chamber contains a valve member 35 pressed radially outwards by a spring 36 and by centrifugal action. In this position the port 34 is closed but when pressure is turned on to the outer end of the valve member by opening the cock 26 it is pressed inwards thereby opening communication between the duct 32 and the port 34 so that oil under pressure enters the diaphragm chamber and presses the insulator plate against the pressure plate and the latter against the clutch plate whereby the latter is gripped between the flywheel and the pressure plate. When the cock 26 is closed any pressure of oil at the outer end of the valve member can leak past the valve member and oil then escapes from the diaphragm chamber through a groove 40 in the valve member and an outlet port 41, whereupon springs 15 move the pressure plate to disengage the clutch.

Another valve chamber 43 is provided having a port 44 communicating with the diaphragm chamber near the inner periphery of the latter. The valve chamber 43 contains a valve member 46 which is urged inwardly by a spring 47. In its inner position it provides escape of oil from the diaphragm chamber through the port 44 and a groove 48, and ducts 49, 50, and 51, into the air space in the interior of the housing to ensure an oil mist supply to the friction surfaces during disengagement. Holes 53 in the flywheel prevent build up of a pocket of oil on one side of the clutch plate.

The spring 47 is strong enough to hold the valve member 46 in its inwards position during all normal clutch take-up speeds but at higher speeds the valve member moves outwards under centrifugal action and closes the port 44.

The oil from the duct 52 is sufficient to provide a good supply of oil through grooves 55 formed by ribs 56 on the rear face of the pressure plate. These grooves are closed on the rear face by the heat insulator plate. The inner rib has a gap 57 permitting entry of oil and the next rib has a gap 58 offset 180° from the gap 57, to permit entry of oil to the next groove. Similarly the other ribs have gaps offset as described so that the set of grooves provides a sinuous passage for the oil over the plate whereby it is cooled by the plate, the oil finally escaping through the gap 60 in the outer rib. Centrifugal action will cause the oil to flow rapidly over the plate.

A small quantity of the oil flows over the edges of the insulator plate and reaches the surfaces between the diaphragm and the pressure plate. This surface of the diaphragm is thus lubricated which has a beneficial effect in preserving the diaphragm.

Having now particularly described and ascertained the nature of my said invention and in what manner the same is to be performed, I declare that what I claim is:

1. A device of the character described, including a friction plate, a pressure plate adjacent thereto, a heat insulator plate adjacent the pressure plate, sinuous grooving between the latter plates extending from near the center to near the periphery, and having at least one oil inlet near the center of the plates and at least one outlet near the outer edge of the plates, the walls of said grooving being shaped to constrain the oil to pass in a sinuous path from said inlet to said outlet, and means to supply oil to the inlet, whereby oil will be circulated over a considerable area between the plates before escaping at the outlet.

2. A device as claimed in claim 1, wherein the grooving is in the pressure plate and is closed except for the inlet and outlet by the insulator plate.

3. A device as claimed in claim 1, wherein the grooving is a plurality of concentric grooves and each groove is connected by a small opening to the next groove, these openings being arranged at different positions around the grooves.

4. A device as claimed in claim 1, wherein an expansible diaphragm is positioned to apply pressure to said plates through the insulator plate.

5. A device as claimed in claim 4, including means for supplying oil under pressure, whereby such oil is forced against the diaphragm, a valve centrifugally operable below a predetermined low speed for exhausting such oil from against the diaphragm, and a duct near the center leading from said valve to the grooving.

HOWARD FREDERICK HOBBS.

REFERENCES CITED

The following references are of record in the file of this patent:

UNITED STATES PATENTS

| Number | Name | Date |
| --- | --- | --- |
| 606,959 | Doolittle | July 5, 1898 |
| 1,860,375 | Winterer et al. | May 31, 1932 |
| 2,020,748 | Waseige | Nov. 12, 1935 |
| 2,382,570 | Kraft | Aug. 14, 1945 |
| 2,437,670 | Adamson | Mar. 16, 1948 |